(12) United States Patent
Stark

(10) Patent No.: US 7,425,000 B2
(45) Date of Patent: Sep. 16, 2008

(54) MODULAR, RAPID-ACTION CLAMPING CYLINDER

(75) Inventor: Emil Stark, Goetzis (AT)

(73) Assignee: SSA System-Spann AG, Zurich (CH)

(*) Notice: Subject to any disclaimer, the term of this patent is extended or adjusted under 35 U.S.C. 154(b) by 53 days.

(21) Appl. No.: 10/553,370

(22) PCT Filed: Apr. 15, 2004

(86) PCT No.: PCT/EP2004/003969
§ 371 (c)(1),
(2), (4) Date: Jul. 13, 2006

(87) PCT Pub. No.: WO2004/091849
PCT Pub. Date: Oct. 28, 2004

(65) Prior Publication Data
US 2007/0063404 A1 Mar. 22, 2007

(30) Foreign Application Priority Data
Apr. 15, 2003 (DE) .................. 103 17 337

(51) Int. Cl.
*B23Q 3/00* (2006.01)

(52) U.S. Cl. ...................... 269/309; 269/310
(58) Field of Classification Search ............... 269/309, 269/310, 32; 409/225; 279/4.06, 4.12
See application file for complete search history.

(56) References Cited

U.S. PATENT DOCUMENTS

| 6,073,325 | A  | * | 6/2000 | Stark | 29/33 P |
|---|---|---|---|---|---|
| 6,532,861 | B2 | * | 3/2003 | Etter | 92/86 |
| 6,997,448 | B2 | * | 2/2006 | Roth et al. | 269/309 |
| 2007/0063403 | A1 | * | 3/2007 | Stark | 269/309 |
| 2007/0158891 | A1 | * | 7/2007 | Stark | 269/309 |
| 2007/0210501 | A1 | * | 9/2007 | Stark | 269/309 |

* cited by examiner

Primary Examiner—Lee D Wilson
(74) Attorney, Agent, or Firm—Cooper & Dunham LLP

(57) ABSTRACT

Quick-action clamping cylinder for general locking tasks in mechanical engineering, said quick-action clamping cylinder being used to anchor a feed nipple located on any desired part, the built-in components of the quick-action clamping cylinder that are fundamental to its function being configured as an insert module which are able to be fitted into the into the housing of the quick-action clamping cylinder in a modular manner.

22 Claims, 15 Drawing Sheets

MODULAR, RAPID-ACTION CLAMPING CYLINDER

The invention relates to a quick-action clamping cylinder of modular design according to the preamble of patent claim 1.

A quick-action clamping cylinder has been disclosed in DE 101 23 270 A1 from the same Applicant. The disclosure content of said application is intended to be included in full in the disclosure content of the present invention.

As is known, a quick-action clamping cylinder of this kind is used to clamp workpiece pallets or clamp plates in the quick-action clamping cylinder, a feed means being arranged on the workpiece pallet or clamp plate and being fitted with clamping in the central recess of the quick-action clamping cylinder.

The quick-action clamping cylinder described here is therefore used for general locking tasks in mechanical engineering, where the aim is for a feed nipple, located on any desired part, to be anchored in the central recess of the quick-action clamping cylinder.

In DE 101 23 270 A1 from the same inventor, a quick-action clamping cylinder has been described already, but one which is made up of a large number of different parts. This is associated with the disadvantage that it takes up a lot of space, that is to say requires large installation dimensions, and contains a large number of individual parts, which are all very expensive to produce. Because of the large number of parts present, sealing problems may also arise, because the parts have to be sealed off from one another (pressure oil chamber and air inlet chamber), which entails a large number of necessary seals.

The object of the invention is therefore to develop a clamping device with a quick-action clamping cylinder according to the preamble of patent claim 1 in such a way that it has considerably fewer parts, can be produced at less cost and operates safely.

To achieve this object, the invention is characterized by the technical teaching of claim 1.

An important feature is that the quick-action clamping cylinder has considerably fewer parts, namely just a lid, a housing, a piston which can be driven by pressure oil in the space between lid and housing and which is spring-loaded against a spring assembly, and associated balls which can be locked with the feed nipple.

According to the invention, the quick-action clamping cylinder is in principle made up only of the above-mentioned small number of parts, with the advantage that these parts can be very simply sealed off with respect to one another and are very easy to produce. Therefore, according to the invention, an extremely large number of component parts can be dispensed with, as will be set out in detail here on the following pages. Deep cuttings that are difficult to form, and were necessary in DE 101 23 270 A1, can be dispensed with. The latter document disclosed two different pistons, namely a larger drive piston, which acted against the spring assembly, and a smaller piston, which was responsible for locking the balls.

This multiplicity of parts (in particular the two differently driven pistons) can now be dispensed with according to the invention, because, according to a further feature of the invention, the feed nipple is held with self-looking in the housing of the quick-action clamping cylinder. This means that the balls enter into positively locking engagement with the feed nipple, that is to say a separate control piston controlling the movement of the balls can be omitted. The balls are either in positive engagement with the feed nipple or they are removed from the feed nipple, as a result of which the feed nipple can then be withdrawn from the central recess.

An advantage of this measure is that a block closure is realized, which means that the locking takes place under the force of the spring assembly, which spring assembly press the balls in their engagement position on the feed nipple, and the unlocking of the quick-action clamping cylinder takes place under the effect of pressure oil which is introduced into the housing into the space between the underside of the lid and the top face of the piston.

A complicated pressure chamber for the pressure oil is thus avoided because the pressure chamber is arranged directly under the lid and above the piston in the interior of the housing, as a result of which only minor sealing measures are required.

In the document mentioned at the outset, it was necessary that the pressure oil was conveyed across a large surface area on the underside of the lid, which had the disadvantage that the lid bulged upward. According to the invention, this is now avoided by the fact that a pressure oil chamber is provided which is substantially offset radially outward on the inner wall of the housing, extends only as a narrow and annular chamber on the inner wall of the housing and is arranged directly above the piston.

This pressure oil chamber has, with its surface subjected to pressure, only a few percent of the surface as had to be used by comparison in earlier DE 101 23 270 A1.

With the design of a relatively narrow, annular and peripheral pressure oil chamber on the underside of the lid and the top face of a piston arranged displaceably in the lid, the further advantage is achieved that the oil inlet can now be formed directly radially outward and in true alignment in a radial extension to this pressure oil chamber.

Instead of a vertically offset oil inlet, as is known in the prior art, the oil inlet can now also be formed directly radially outward in a straight line with the oil pressure chamber. This gives direct, straight and short connection bores from the oil inlet into the oil pressure chamber, which is achieved minimal flow losses and low production costs and with inexpensive sealing measures.

For the introduction of the pressure oil, all that is needed is a cutting in the space between the housing and the lid, which then conveys the pressure oil directly to the top face of the piston and to the underside of the lid into the pressure chamber arranged there.

With the radially outwardly directed oil inlet bore, the further advantage is achieved that a quick-action clamping cylinder of this kind can now also be installed embedded in a central recess in the machine bench, and the pressure oil can now be directly guided in from the side radially in the machine bench to the quick-action clamping cylinder built into the central recess. This has the advantage that only short flow distances are needed for the pressure oil and that a horizontal middle bore can be arranged in the machine bench, and several quick-action clamping cylinders arranged in separate recess can be supplied with pressure oil via this middle bore.

It is thus possible to dispense with corresponding upward bores, downward bores and diversion bores, as were needed in the prior art. Such upward bores, which were generally introduced vertically from the top or bottom into the machine bench, had to be subsequently closed with corresponding stoppers, which was associated increased cost.

With the formation of a radially outward and approximately annular and narrow pressure chamber for the pressure oil, the further advantage is achieved that the entire underside of the quick-action clamping cylinder is kept free from pressure oil. It is now no longer necessary to introduce the pressure oil into the quick-action clamping cylinder from the direction of the base, as is the case in the prior art.

This has the advantage that a very simple structure is now obtained, because the entire recess under the central recess in the quick-action clamping cylinder can be used for the arrangement of the spring assembly and the ball support.

In a development of the invention, it is therefore provided that all the built-in components in this area are configured as an insert module which are able to be fitted from above into the central recess into the housing of the quick-action clamping cylinder in a modular manner.

According to the invention, such an insert module consists of a spring-holding plate 22, which receives the disk spring, and of an associated ball support on which the locking balls for locking the feed nipple lie.

When it was previously mentioned that the insert module is fitted from above, this is not to be understood as limiting the invention. In another embodiment, the quick-action clamping cylinder is assembled by the insert module being fitted from above into the tubular housing initially present.

In a construction situation in which the quick-action clamping cylinder is to be secured on a defined mounting surface, this is achieved by the insert module first being inserted from above into the tubular housing, the piston then being fitted into the tubular housing, and finally the balls being placed on the ball raceways of the ball support, and finally the lid then being put on and securely screwed.

In this assembly sequence it will be seen that very simple and safe assembly is permitted because only a small number of parts have to be connected to one another.

The aforementioned insert module is preferably placed on an associated stop surface on a tubular housing, said stop surface being able to be formed by a large number of locking balls which are arranged, uniformly distributed about the circumference, in a radially inwardly open annular groove on the housing.

Instead of locking balls of this kind, it is also possible to use a peripheral securing ring which protrudes radially inward from the inner wall of the tubular housing toward the inside and which forms the radially outwardly directed stop surface for the insert module.

By contrast, in an installation situation in which the quick-action clamping cylinder is fitted in a central recess in the machine bench, it can even be the case that a tubular housing is dispensed with and the piston acted on by pressure oil runs sealingly and directly on the side walls of the central recess in the machine bench.

If, by contrast, the side wall of the central recess in the machine bench is not to be machined with high precision to form a sealed running surface for the piston, then it suffices to insert a ring part which replaces the annular housing part in the construction situation.

This is necessary especially if the three recesses in the machine bench have shrink holes which prevent sealing of the piston with its sealing rings on these surfaces.

Such measures may also have to be taken if the recess in the machine bench has no "hydraulics" quality.

A decisive feature of all the embodiments is that, because of the simple construction, there are now a large number of possibilities of realizing different modifications. It is therefore a modular construction of a quick-action clamping cylinder, which in particular can be provided in a blow-out version and a non-blow-out version.

The insert module can accordingly be connected to different component parts, all of which have no load-bearing involvement.

For example, if a blow-out version for the quick-action clamping cylinder is to be realized, it then suffices to screw a corresponding further base onto the insert module, which base bears sealingly on the tubular housing and forms an inner peripheral air gap which distributes air in the interior of the quick-action clamping cylinder.

In addition to the possibility of screwing on a lid used for air delivery, there is also the possibility of using the insert module with its functional parts as a centering aid or assembly aid for anchoring of the associated drill bushes of a perforated grid plate. It is possible in this case that the screw-on base forms one or more axially projecting pegs which engage associated drill bushes of a perforated grid plate and thus secure the quick-action clamping cylinder on this perforated grid plate.

Such a peg thus serves, in all embodiments, for centering the quick-action clamping cylinder on a corresponding support surface.

In the non-blow-out version, it is also possible, instead of using the air-conveying base, to connect an adapter to the insert module, which adapter forms an axially protruding peg via which the latter again engages in associated centering recesses of a perforated grid plate.

The adapter is an especially narrow and inexpensive part that can be very easily connected to the insert module.

Because of the complete freedom of the central interior of the quick-action clamping cylinder and of any pressure oil chambers (because these have been offset radially outward), there is the further possibility that corresponding outlet openings can be routed from the interior, and from these outlet openings, for example, drilling water and a medium carrying chips and dirt and the like can flow off downward.

It is of course also possible for air to be blown correspondingly into the central inner bore, which is opened at the bottom, so as to permit a central air blow-out from the quick-action clamping cylinder.

In another embodiment, provision is also made that a coolant is guided through the central, outwardly routed recess, which coolant is introduced under pressure into the central recess. Instead of blowing out the cylinder, flushing with a corresponding cleaning medium can also be effected.

Flushing has the advantage that a pressure of more than 6 bar can be used, as a result of which a particularly good cleaning action is achieved.

A further advantage of the invention is to be seen in the fact that a so-called block closure is achieved for the feed nipple in the housing of the quick-action clamping cylinder. This means that there is no ventilation clearance from feed nipple in which, according to the known arrangements of the prior art, the disadvantage was that the feed nipple, even in the locked state, could still be withdrawn from the housing of the quick-action clamping cylinder by a small displacement path of, for example, 2 mm.

This is avoided with the block closure according to the invention. The locking balls are assigned on the one hand to raised surfaces of the ball support, for in the quick-action clamping cylinder in the locked state in a form-fit manner, and, on the other hand, are clamped on the underside of the lid, as a result of which they are no longer movable and bear in this locked position in a defined manner in the associated annular recess on the feed nipple. The latter is thus absolutely locked and is secured free from play.

The subject of the present invention derives not only from the subject matter of the individual patent claims but also from the combination of the individual patent claims.

All the details and features disclosed in the documents, including the abstract, in particular the spatial design shown in the drawings, are claimed as inventive and they are novel, either individually or in combination, relative to the prior art.

The invention is explained in more detail below with reference to drawings which show a number of embodiments. Further important features and advantages of the invention will become apparent from the drawings and from their description.

Figure 1:
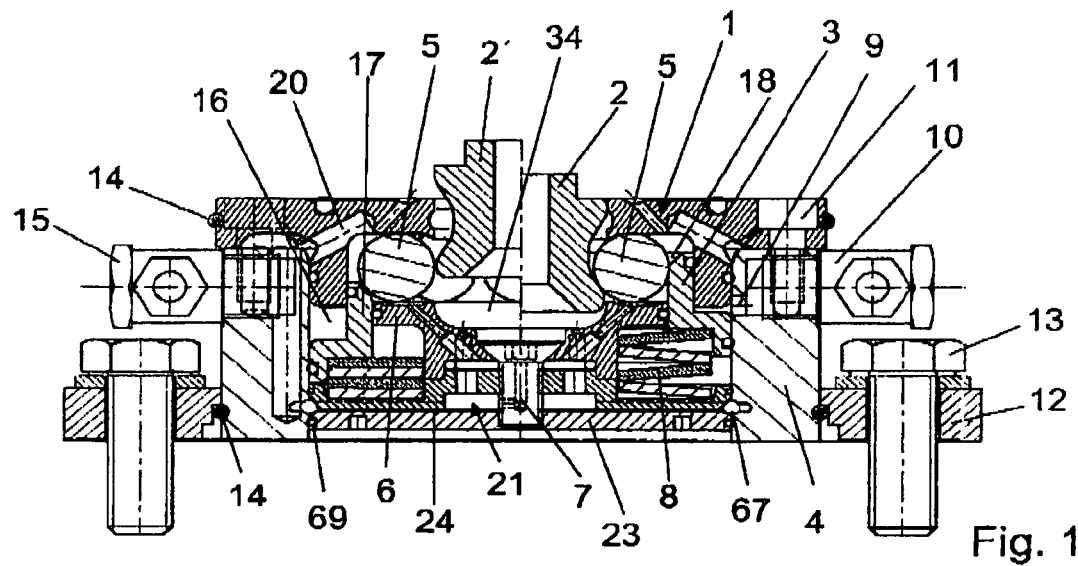
FIG. 1 shows a cross section through a first embodiment of a quick-action clamping cylinder.
Figure 2:
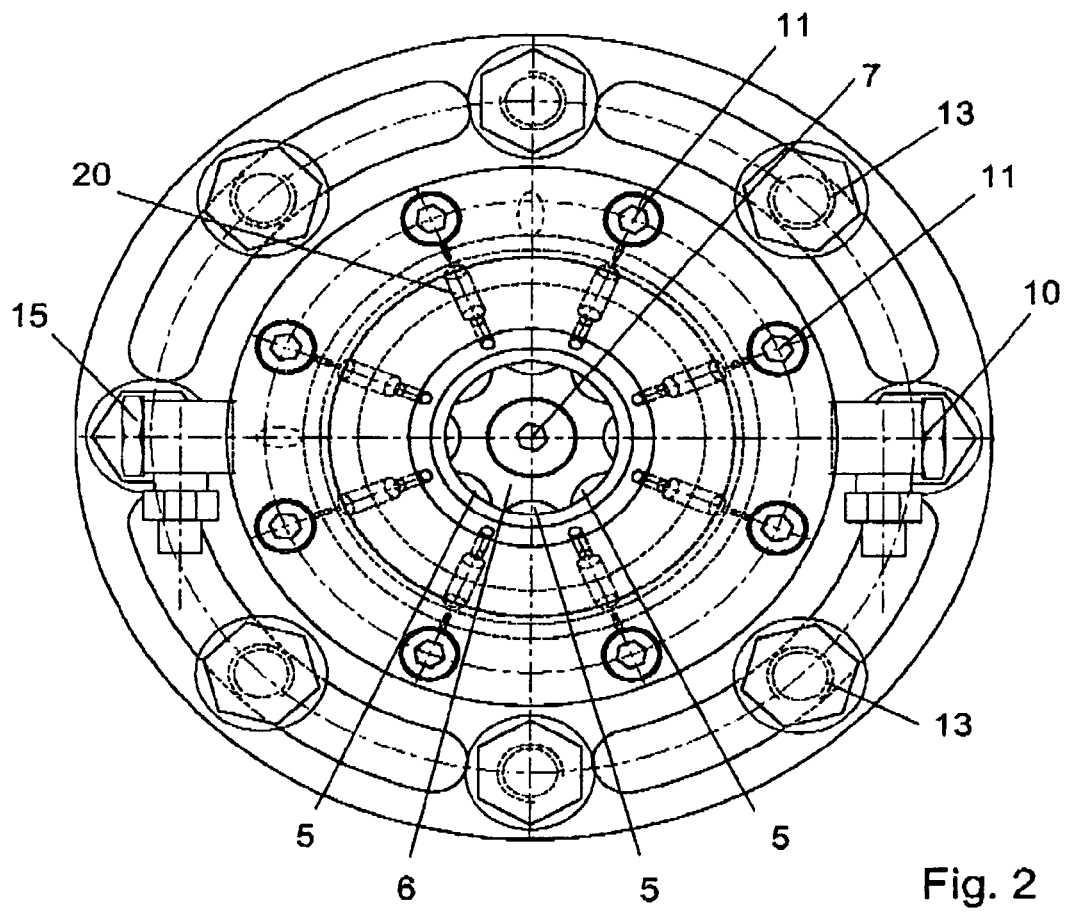
FIG. 2 shows the plan view of the quick-action clamping cylinder according to FIG. 1.

In FIGS. 1 and 2, a first embodiment of a quick-action clamping cylinder is generally shown, consisting principally of an approximately tubular housing 4 which is secured on a mounting surface (not shown in detail) by means of screws 13, which are arranged uniformly about the circumference, and by means of a clamping claw 12. A feed nipple 2 can be driven into the central recess 34 of the quick-action clamping cylinder; it is shown in position 2' in the withdrawn and unlocked state and in position 2 in the locked state.

A securing ring 14 is arranged on the outer circumference of the tubular housing 4, and the clamping claw 12 bears securely on this securing ring 14.

A piston 3 is arranged displaceably in the interior of the housing 4, the piston 3 forming an axially upwardly extended annular shoulder 17 whose radial outer faces bear with associated earrings on the associated inner wall of the lid 1 and are sealingly and displaceably guided there.

The lower part of the piston 3 is radially widened and bears sealingly on the inner circumference of the housing 4. By this means, a pressure chamber 16 for the oil is formed between the underside of the lid 1, the annular shoulder of the piston 3 and the housing 4. This pressure chamber 16 is therefore very narrow and extends round in a circle and is offset radially outward as far as possible.

Any high pressure in this pressure chamber 16 therefore does not lead to undesired upward bulging of the lid 1, because the pressure chamber is formed as radially as possible, far outward on the inner face of the housing 4.

Because the radial distance between the pressure chamber 16 and the screws 11 for securing the lid 1 on the housing 4 is very small, this results in a very small lever arm, so that upward bulging of the lid 1 need not be feared.

In view of the fact that the pressure chamber 16 is arranged underneath the lid and that the piston forms a radial insert offset annular shoulder 17 and a radially outwardly offset shoulder, the maximum cross section of the lid is located in the space between these two mutually offset parts of the piston 3, which lid therefore has a particularly high material strength in the area of the pressure chamber, thus counteracting undesired upward bulging.

The pressure chamber 16 therefore has only a very small oil content, so that, with a small amount of pressure oil, it is possible to supply a large number of quick-action clamping cylinders arranged in a machine bench 53. Thus, only a small oil volume is present.

An important feature is that a large number of balls 5 bear on the inner face of the axial annular shoulder 17 of the piston 3, which balls 5, from this annular shoulder, are either moved radially inward to the feed nipple 2 or are moved away therefrom. For this purpose, ball raceways are accordingly created on a ball support 6 and form depressions for the balls.

In the unlocked state (according to the left half section in FIG. 1), the balls 5 lie in the recessed ball supports and accordingly are at a distance from the underside of the lid 1.

In the left half section, however, this is not shown because here the lower shoulder of the feed nipple is still drawing the ball against the underside of the lid. However, once this radially outwardly directed shoulder of the feed nipple 2 has run past the ball 5, the latter then drops into the ball-shaped recess on the surface of the ball support 6.

The radial shoulder on the underside of the feed nipple 2 also permits a movement of the ball in the locking direction in connection with the annular shoulder 17 of the piston 3.

In the locked position according to the right half section in FIG. 1, the balls 5 are in the engagement position with the feed nipple 2. As can be seen from FIG. 1, the balls in the locked position form a block closure because they are securely clamped, completely and without play, on the one hand between the ball support 6 and on the other hand on the underside of the lid 1 and thus bear with a form fit on the circumferential groove on the feed nipple 2.

This circumferential groove forms a bevel which is inclined with respect to the longitudinal axis of the feed nipple.

Figure 5:
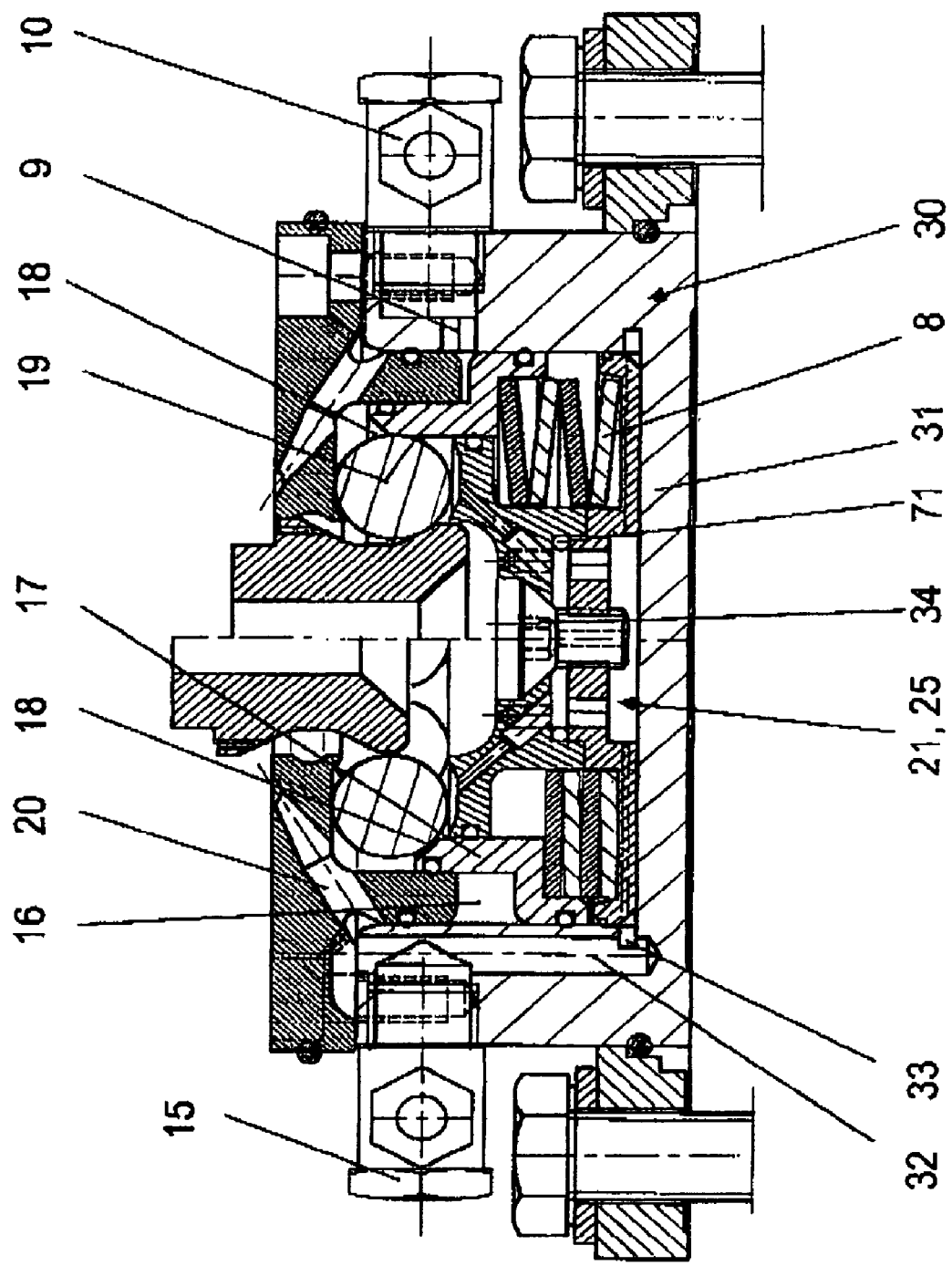
FIG. 5 shows a cross section through a second embodiment of a quick-action clamping cylinder (with pot-shaped housing)

A comparison of FIG. 1 and FIG. 5 also reveals that two bevels lying one behind the other are arranged on the inner face of the axial annular shoulder 17 of the piston 3. First, a bevel 19 with an angle of approximately 5° to the perpendicular is provided, which bevel 19 merges axially outwardly into a flatter bevel 18 with an angle of, for example, 45° to the vertical.

In the locking movement of the piston 3 with axially outwardly directed movement, the greater bevel 18 will first bear on the balls 5 and move these radially inward in the direction of the feed nipple 2. This is designated as high-speed stroke. As soon as the balls 5 are then bearing with a form fit on the associated bevel on the feed nipple 2, the bevel 19 also bears on the circumference of the balls, and, with this bevel 19, the relatively large spring force of the spring 8 (disk spring) is transmitted to the balls, specifically in a ratio of 6.5:1. This means the spring force of the spring 8 is translated by 6.5 times to the balls 5, which bear with precisely correspondingly great locking force on a feed nipple 2.

The nipple is thus held in the locking position, for example, with a locking force of 2 metric tons.

This therefore is the quick-action clamping system, the only one up to now, which represents a block closure and exerts a feed force on the feed nipple 2 in the locked position.

The advantage is thus achieved that, in the event of buckled pallets being pulled down with the feed nipple 2, these are forcibly straightened. At the same time, an undesired vibration of the milling cutter is avoided.

The pressure chamber 16 is connected to pressure oil via a radially outwardly lying oil starter 10, the pressure oil passing into the pressure chamber via an oil bore 9.

Where the term "pressure oil" is used above, this is not to be understood as being limiting. Instead of "pressure oil", it is of course possible to use all other liquid media for supplying the pressure chamber 16, in particular also glycol, gas, water and the like.

An important feature is that, at the side opposite from the oil inlet 10 merging in the horizontal direction into the housing 4, there is a likewise horizontally incoming air inlet 15. With this air inlet lying substantially on the same plane, the advantage is achieved that a corresponding horizontal bore for air delivery can be provided also in a central machine bench 53, without the need for vertical connection bores or upward bores, which subsequently have to be closed off with suitable closure means.

The arrangement of the air inlet 15 thus affords the same advantages as were outlined above in respect of the oil inlet 10.

Compressed air is introduced via the inlet 15 into an associated downward bore 32, and this compressed air is then distributed, in the manner to be described farther below, into the interior of the housing of the quick-action clamping cylinder and is delivered to various blow-out sites.

Instead of introducing compressed air via the air inlet 15, a coolant can of course also be introduced into the interior via this inlet and can be flushed to corresponding blow-out sites (flushing sites).

FIG. 2 shows, for example, that from the downward bore 32 shown in FIG. 5, inclined upwardly directed bores 20 are also supplied, and these supply blow-out sites directed obliquely with respect to the feed nipple 2.

Figure 3:
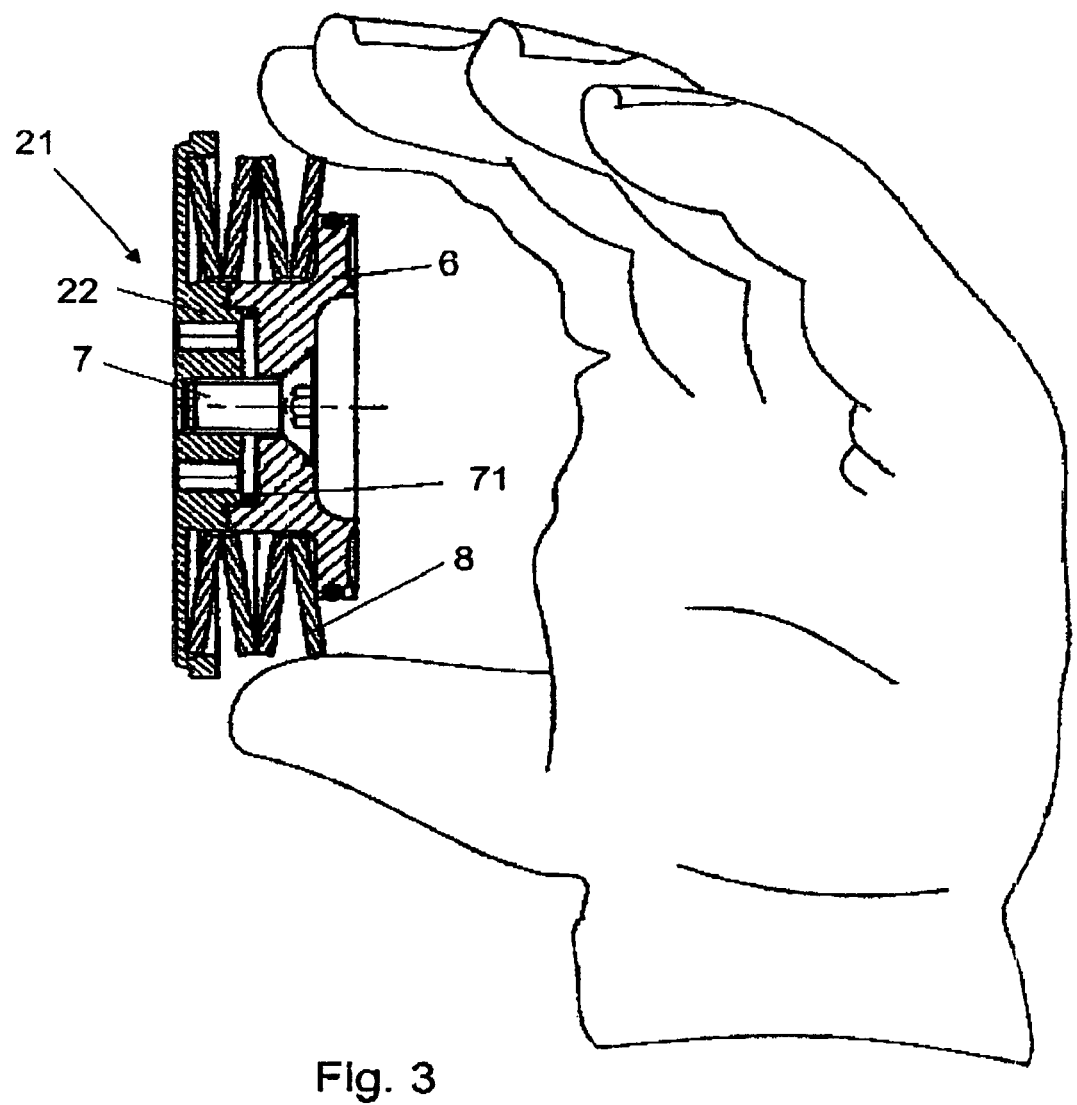
FIG. 3 shows a cross section through a first embodiment of an insert module.

FIG. 1 shows a first illustrative embodiment of a so-called insert module 21, which is shown in more detail in FIG. 3. This insert module is especially advantageous if the quick-action clamping cylinder is to be assembled in an inclined or vertical configuration or in an overhead assembly. The insert module has the advantage that the essential functional components are all held together in a single part, and this part can be exchanged as a whole if any damage occurs. The assembly of the entire unit is also made much easier.

According to FIGS. 1 and 3, the insert module 21 consists of a lower spring-holding plate 22 which forms an annular seat for the spring 8 designed as a disk spring. The other end of this spring 8 bears on the underside of the ball support 6, such that the spring 8 is firmly clamped in a defined manner between these two parts 6, 22 and is secured with considerable pretensioning. The two parts are held together and pretensioned by the screw 7.

FIG. 1 also shows the further advantages of the insert module, because there a longer screw 7 is used whose bolt end emerges from the insert module 21. A base 23 can now be screwed onto this bolt end and bears with a suitable sealing ring 69 on the inner face of the housing 4 and also bears below the rigid balls 67, which locking balls form the abutment for the insert module in the housing 4.

Instead of these locking balls, a securing ring can of course also be used. If such a base 23 is now screwed onto the screw 7, an air gap 24 is created on the inner face of the base, via which air gap 24 the blown-in air from the downward bore 32 can be introduced into the central recess 34 of the housing.

This base 23 therefore does not serve for load-bearing, but instead only for air delivery.

Since it is not involved in load-bearing, it can also be suitably drilled, can have delivery bores or removal bores via which either via which either coolant is delivered or corresponding water without chips is removed from the central recess 34.

The air gap 24 on the top face of the base 23 also opens radially outward into a groove which is recessed radially in the housing 4 and in which the air stream is guided in an annular formation, the aforementioned locking balls 67 being arranged in the same groove.

Figure 4:
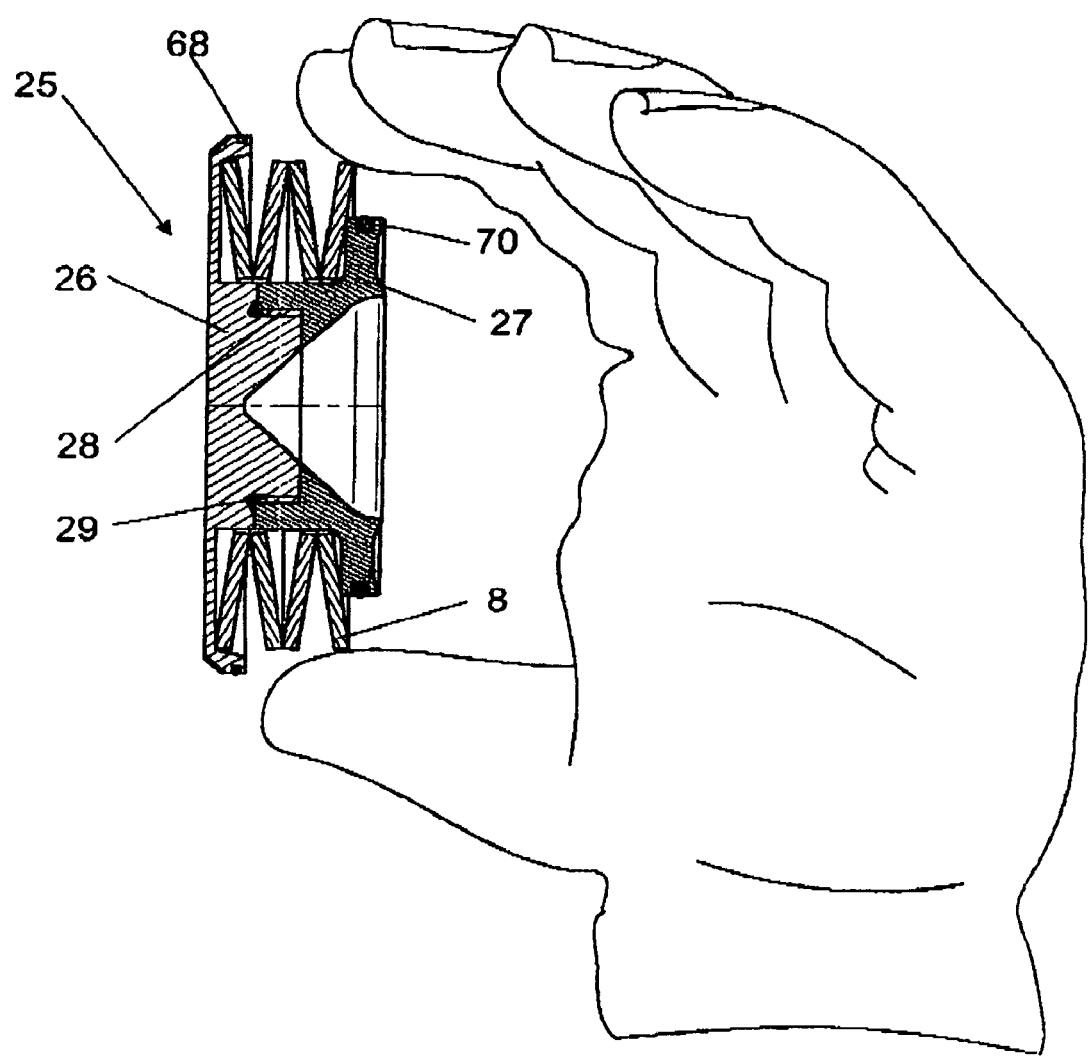
FIG. 4 shows a cross section through a second embodiment of an insert module.

FIG. 4 shows another embodiment of an insert module 25 which again consists principally of a lower spring-holding plate 26 which, in the radially inward direction, carries an axial thread onto which the upper ball support 27 is screwed.

Arranged on the outer circumference of the spring-holding plate 26 there is a sealing ring 68 which bears sealingly on the inner face of the housing 4. This sealing ring is intended to prevent water or dirt or air from getting into the spring chamber of the spring 8 from the underside of the quick-action clamping cylinder.

The sealing ring 70 arranged on the outer circumference of the ball support 27 has the role of ensuring self-locking of the insert module on the inner face of the housing 4, for example if the insert module 25 is fitted into the central recess 34 in the housing 4 in overhead assembly. This prevents the insert module 25 from falling back out. The same role is performed also by the sealing ring 68 on the spring-holding plate 26.

Figure 6:
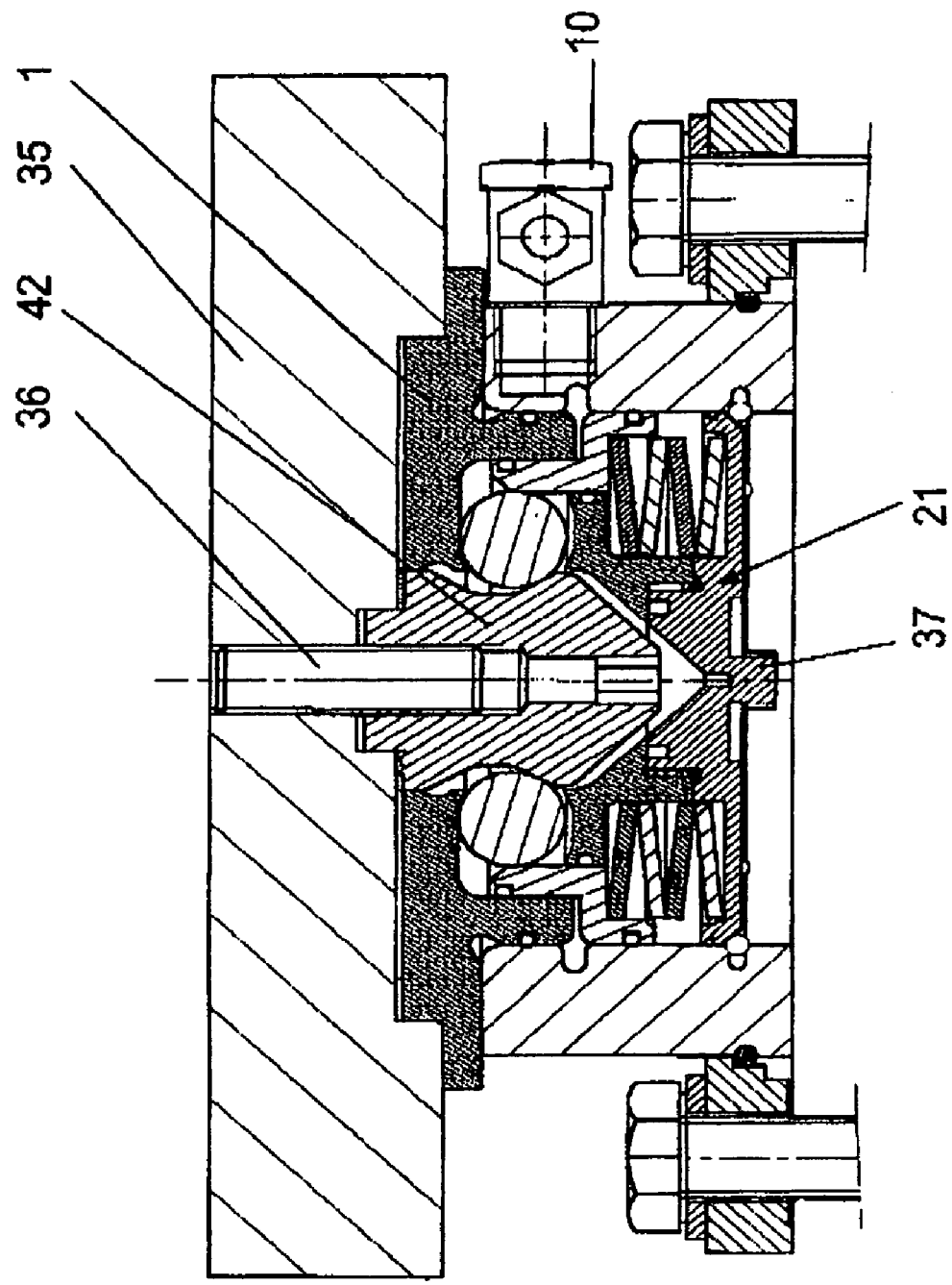
FIG. 6 shows a cross section through a third embodiment of a quick-action clamping cylinder.

The central middle recess in the insert module 25 is adapted to the shape of another feed nipple, which is shown as catch nipple 42 in FIG. 6.

FIG. 5 shows, in a further illustrative embodiment of a quick-action clamping cylinder according to the invention, that instead of a base 23 serving for air delivery, the housing 4 can also be replaced by a pot-shaped housing 30.

This housing 30 is thus designed as a pot and forms a base 31, the material of which is integrally connected to the circumferential pot-shaped side walls.

The whole assembly is carried out from above, that is to say, with the lid 1 removed, the alternately used insert module 21, 25 is first fitted into the interior, and the other parts are then fitted, for example the piston 3 and the balls 5, after which the lid 1 is then fitted and securely screwed with the associated screws.

In this embodiment too, it is shown that the oil inlet 10 opens at a radially outward position into the housing 30 and is arranged at a tight distance below the lid 1 so as to be able to easily take up corresponding pressure forces from the lid.

Referring to the insert module 25 in FIG. 4, it will further be noted that a seal 29 is also arranged between the two parts 26, 27 in order to ensure that, if the ball support is filled with water, this water does not get into the spring chamber of the spring 8.

FIG. 5 further shows that the insert module 21, 25 also has an internal seal 71 which prevents air or dirt from getting into the spring chamber of the spring 8.

FIG. 6 shows the stunning simplicity of a non-blow-out version of a clamping cylinder according to the invention. This figure shows that the feed nipple 2 is securely screwed with a threaded pin 36 in an associated recess on the workpiece pallet 35. The workpieces to be machined are arranged on the top face of the workpiece pallet 35 via clamping tools (not shown in any detail).

Arranged in the underside of the workpiece pallet 35 there is an approximately square recess into which the lid 1 engages with a form fit and in a manner secure against turning. The figure also shows that the previously shown feed nipple 2 is now designed as a catch nipple 42 which, with corresponding widened entry bevels, ensures improved entry into the central recess in the lid 1. Even in the case of a corresponding sideways offset, these entry bevels on the catch nipple 42 also have the effect that a positionally correct introduction of the catch nipple 42 into the central recess of the quick-action clamping cylinder can take place.

The embodiment also shows an insert module 21 on whose underside a threaded plug 37 is integrally mounted into the material, and onto which threaded plug 37 a base, for example, can be screwed, as has been shown with reference to the base 23 in FIG. 1. This base then serves for the completion of the version shown in FIG. 6 if a blow-out version is to be realized.

Figure 7:
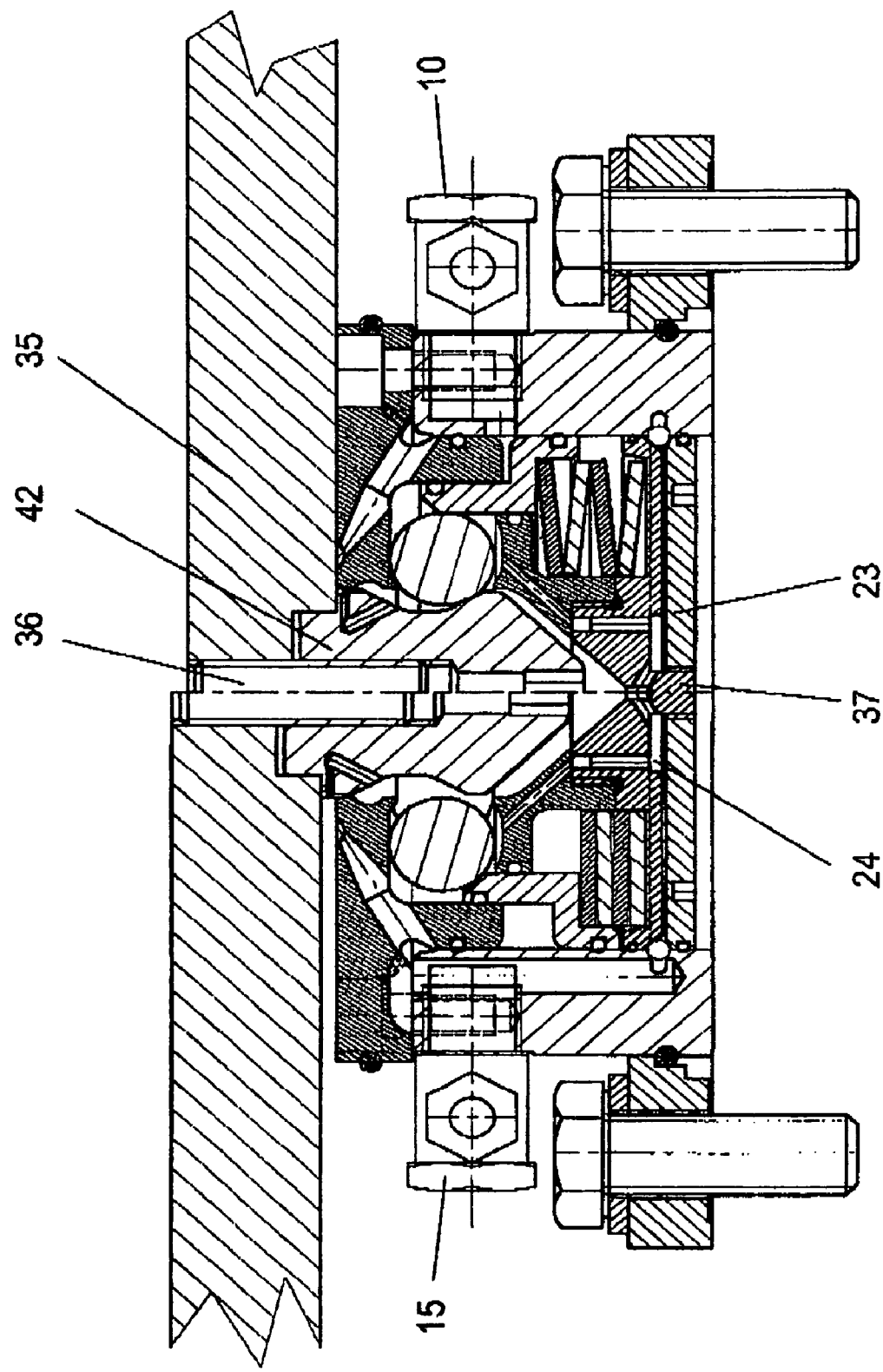
FIG. 7 shows a cross section through a fourth embodiment of a quick-action clamping cylinder.

FIG. 7 shows a corresponding modification in which it can be seen that the plug 37 is arranged on the insert module, and the base 23 is screwed on. Air introduced via the above-described air inlet 15 is therefore distributed via the air gap 24.

Instead of the base 23, it is also possible to use a base 31 which is connected integrally to an axially downwardly directed peg 39, the base again being screwed onto the threaded end of the screws 7.

Figure 8:
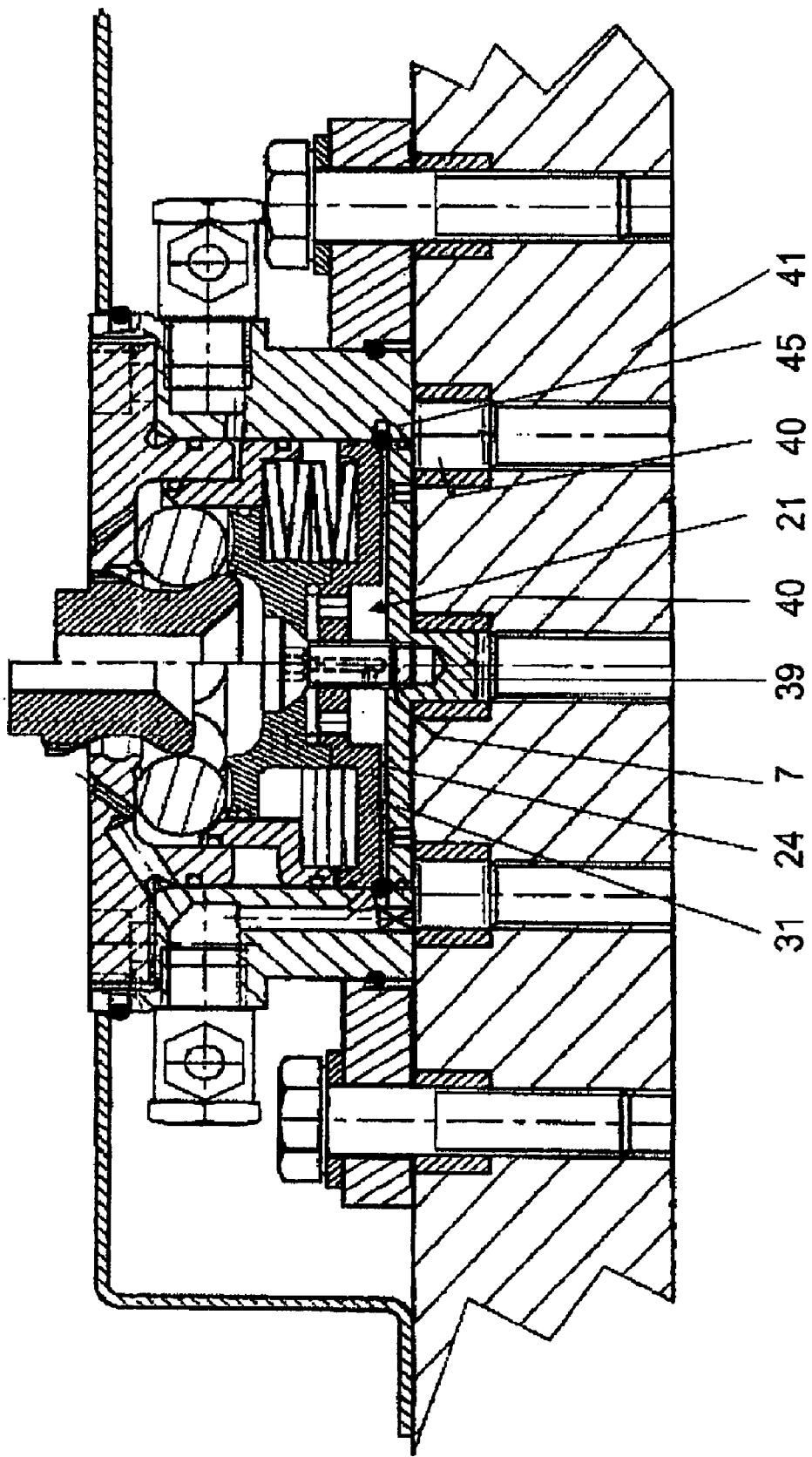
FIG. 8 shows a cross section through a fifth embodiment of a quick-action clamping cylinder.

The peg 39 arranged on the base engages in an associated drill bush 40 in the area of a perforated grid plate 41. In this way, the quick-action clamping cylinder shown in FIG. 8 can be centered on the different perforated grid bores which are formed by the drill bushes 40.

The air is moreover distributed into the air gap 24 starting from the downward bore 32 via a radially outwardly extending passage 33 which connects the horizontal air gap 24 to the vertical downward bore 32 in an air-fit manner.

Figure 9:
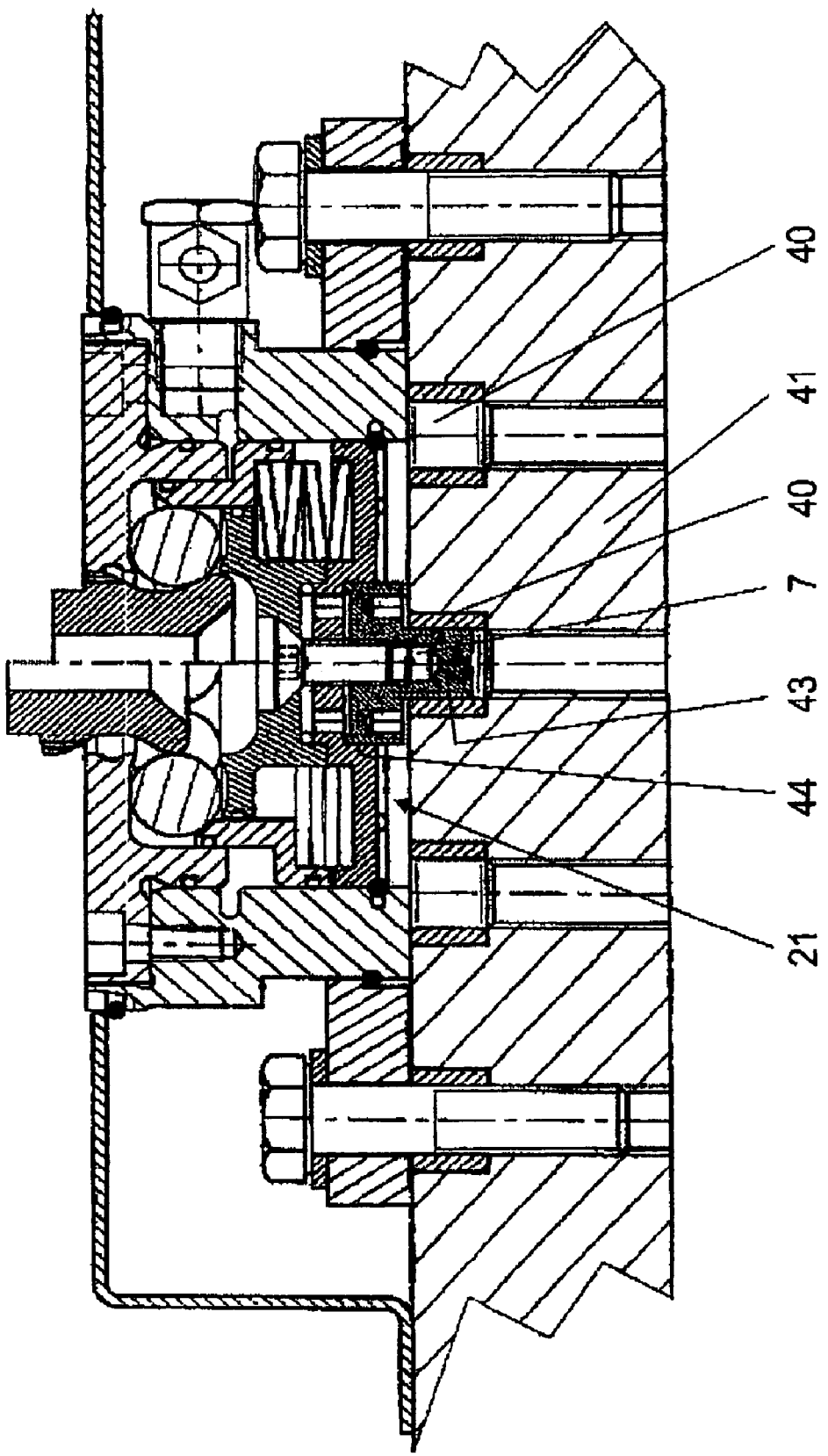
FIG. 9 shows a cross section through a sixth embodiment of a quick-action clamping cylinder.

FIG. 9 shows that, instead of the base 31, the insert module 21, 25 is also connected directly to an adapter 43 which is screwed with its one part onto the thread end of the screw 7 and which, with its other, peg-like extension, in turn engages in the drill bush 40.

Such an embodiment is preferred if an air blow-out is dispensed with.

The adapter 43 is also mounted without play in a centering recess 44 on the underside of the insert module 21, 25 in order thereby to ensure centering, likewise without play, of the quick-action clamping cylinder on an associated mounting surface.

Figure 10:
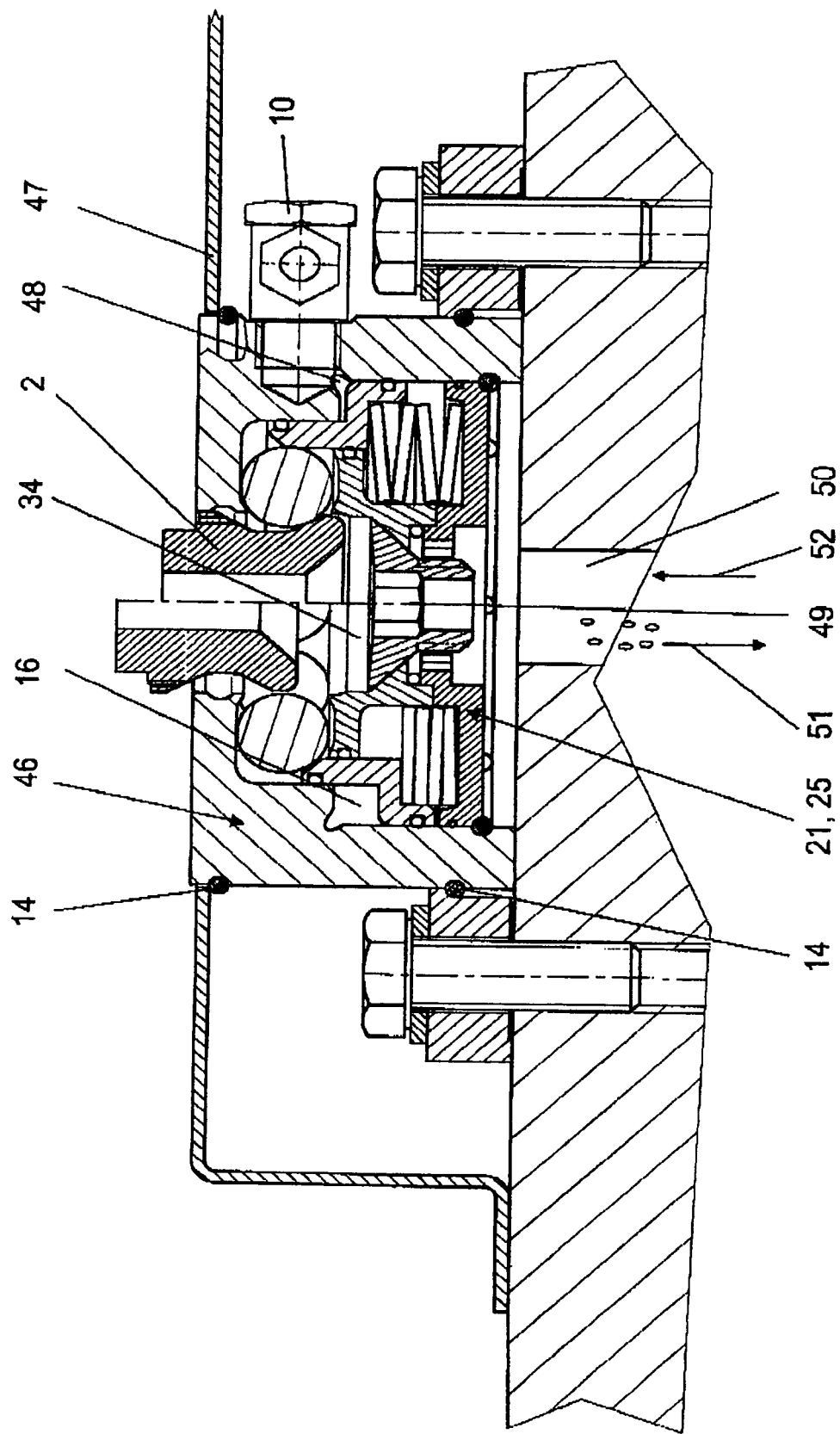
FIG. 10 shows a cross section through a seventh embodiment of a quick-action clamping cylinder.

FIG. 10 also shows that the top face of the quick-action clamping cylinder can be covered by a cover plate 47, and the latter is held by a corresponding securing ring 14. The same securing ring 14 is located also on the underside in order to secure the clamping claw 12 to the housing of the quick-action clamping cylinder.

FIG. 10 moreover shows that the central recess 34 of the quick-action clamping cylinder can also be opened toward the bottom in order thereby either to ensure a downward flow of liquid, in arrow direction 51, or also to deliver corresponding air or coolant or other media from below, in arrow direction 52. For this purpose, the insert module has a central recess 49, and this recess continues at the bottom into a bore 50 in the mounting plate or in the machine bench, so that either a downward flow of liquid or a corresponding supply of media is established through this bore 50.

The housing 46 is also pot-shaped, that is to say the lid is integrally connected to the tubular peripheral annular flange, and this pot-shaped housing 46 is placed with its underside toward the bottom onto the mounting plate and is secured by the clamping claws 12.

FIG. 10 also shows that it is particularly easy to introduce the oil into the pressure chamber 16 via the radial oil inlet 10 and via an associated oil passage 48, which is simply a cutting.

Figure 11:
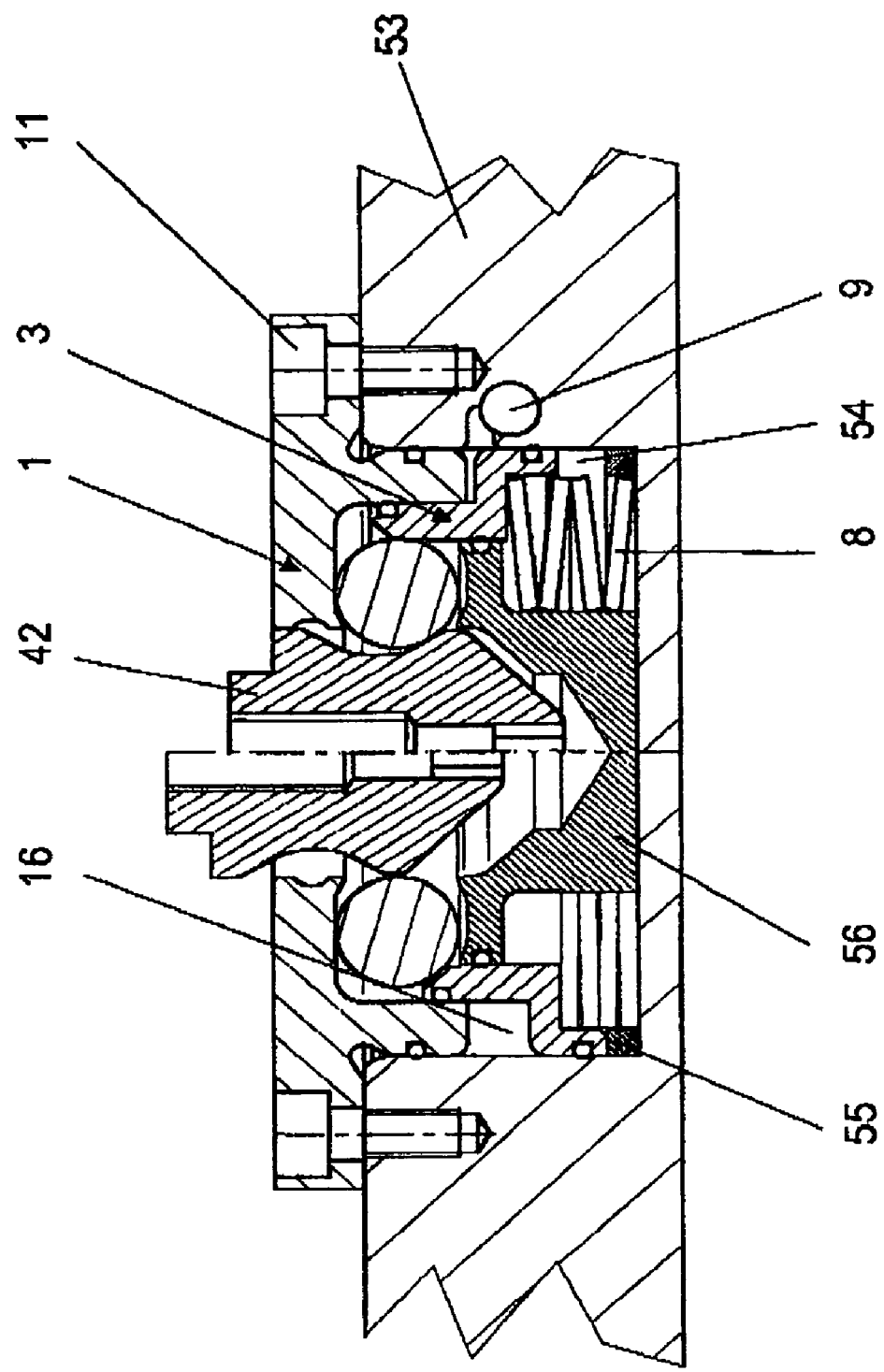
FIG. 11 shows a cross section through an eighth embodiment of a quick-action clamping cylinder.

FIG. 11 shows, as further embodiment, that all the previously depicted configurations of a quick-action clamping cylinder can also be arranged in an embedded position in a central recess 54 in a machine bench 53.

The amazingly simple construction is also evident from the drawing according to FIG. 11. It can be seen that the inner circumference of the recess 54 is used directly as a piston sealing surface and piston running surface for the piston 3, and that the insert module 21, 25 can be fitted in this central, upwardly open recess 54.

It is of course also possible to insert a single ball support 56 into the central recess 54, by which means it is possible to do without one component part of the insert module 21, 25, namely the spring-holding plate 22.

The spring 8 to be secured is therefore held directly under the ball support 56, and the piston runs sealingly, on the one hand, on a radial outer face of the ball support 56 and, on the other hand, on a radial inner face of the central recess 54.

The piston 3 also runs with its annular flange 17 sealingly along the inner face of the lid 1, resulting in a much simpler structure for the pressure chamber 16.

A stop ring 55 is also fitted in the interior of the recess 54 and serves as a stop surface for the piston 3.

Figure 12:
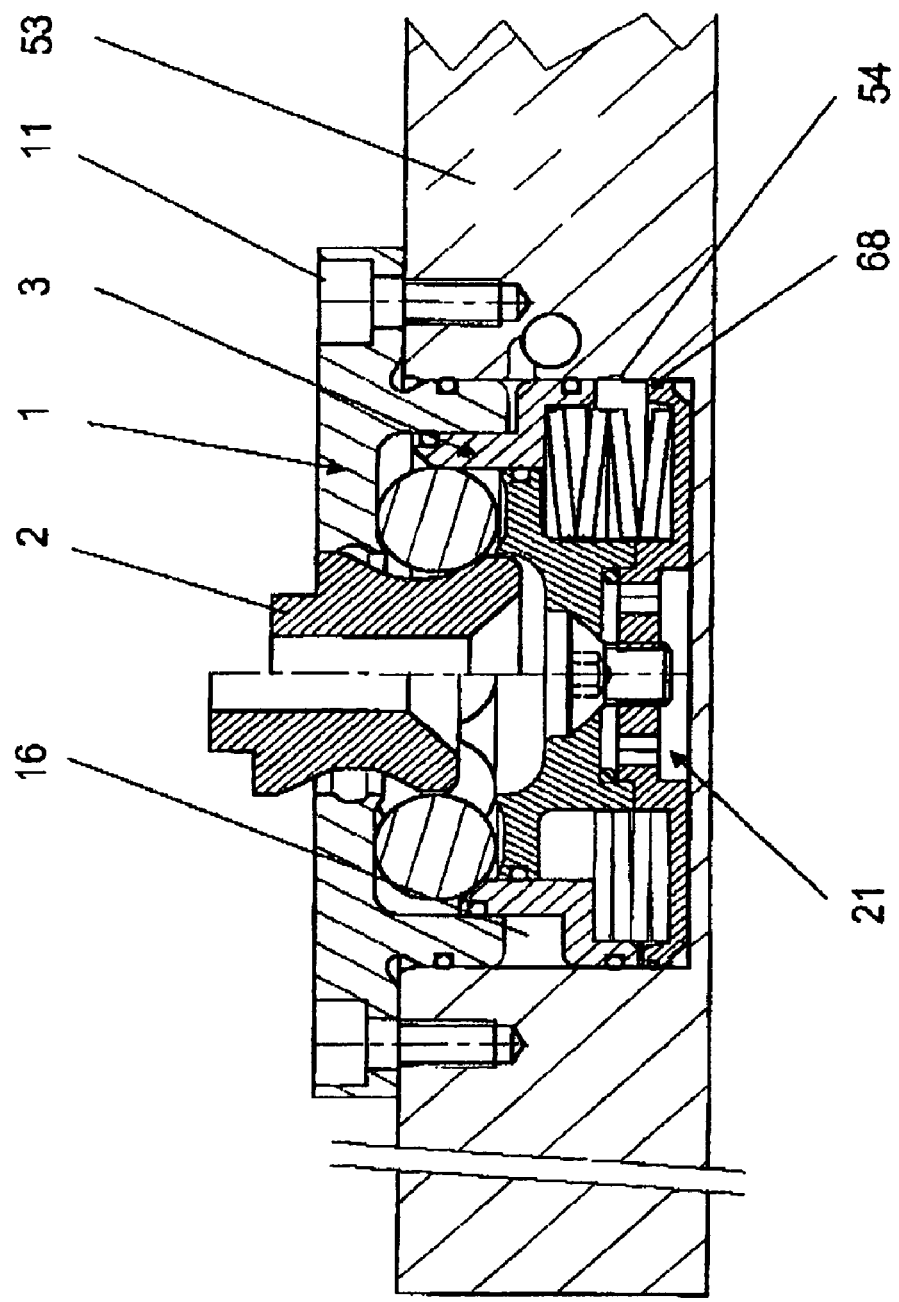
FIG. 12 shows a cross section through a ninth embodiment of a quick-action clamping cylinder, built into a machine bench.

This embodiment does not permit overhead assembly. If overhead assembly is needed, the design according to FIG. 12 is preferred. Here, an insert module 21, 25 is used which, with its previously described radially outwardly situated sealing rings, is clamped on the inner circumference of the recess 54 and is thus secured against falling out of the recess, even in overhead assembly.

Figure 13:
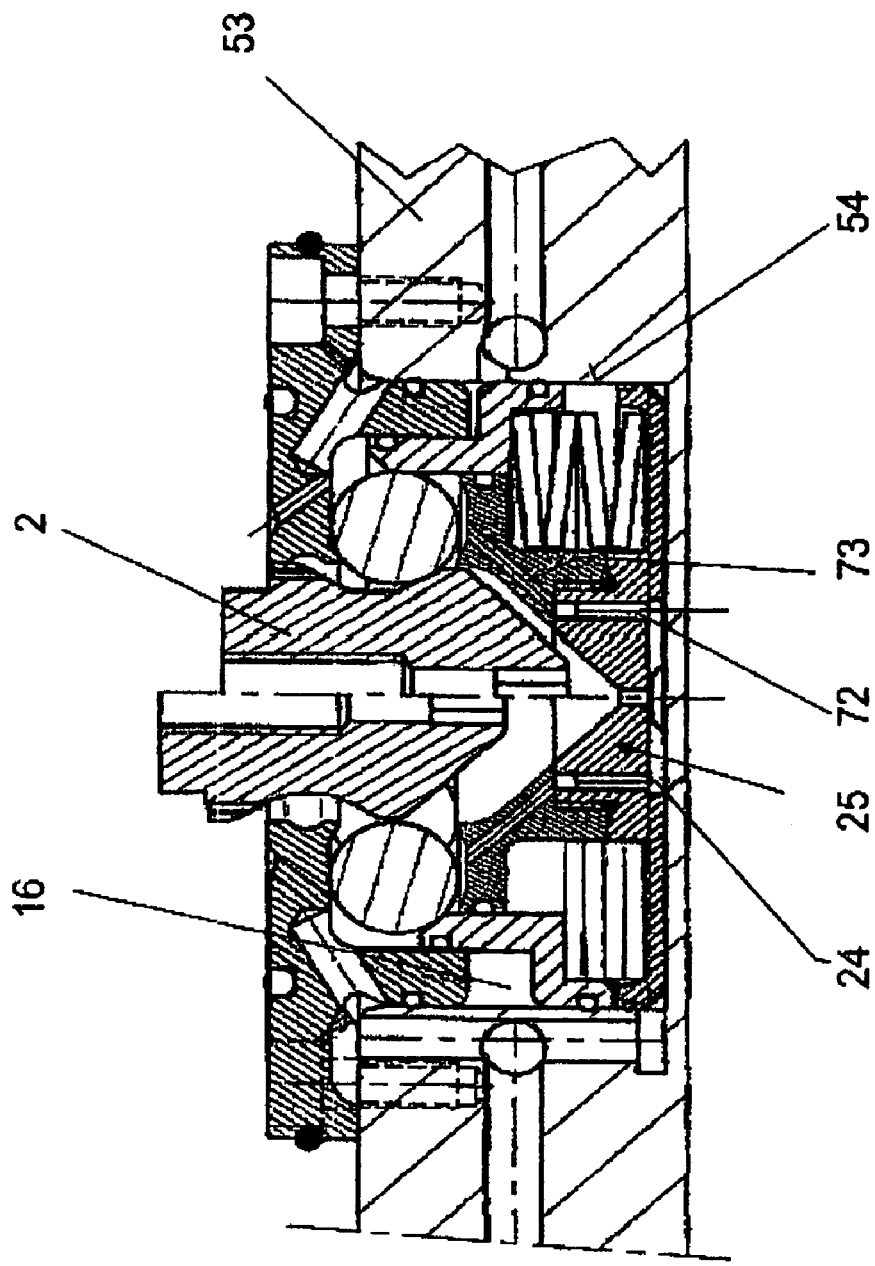
FIG. 13 shows a cross section through a tenth embodiment of a quick-action clamping cylinder, built into a machine bench.

The blow-out version of the design according to FIG. 12 is shown FIG. 13. Here, it will be seen that the insert module 25 at the same time forms an air-conducting base for the blow-out air, because the air-conducting air gap 24 is formed on the plane of the base of the plug-in module.

Extending vertically upward in front of the air gap 24 there is an upward bore 72 which opens into the associated inclined bores 73. In this way, the whole interior of the quick-action clamping cylinder can be supplied with air which is delivered to the corresponding blow-out sites.

Figure 14:
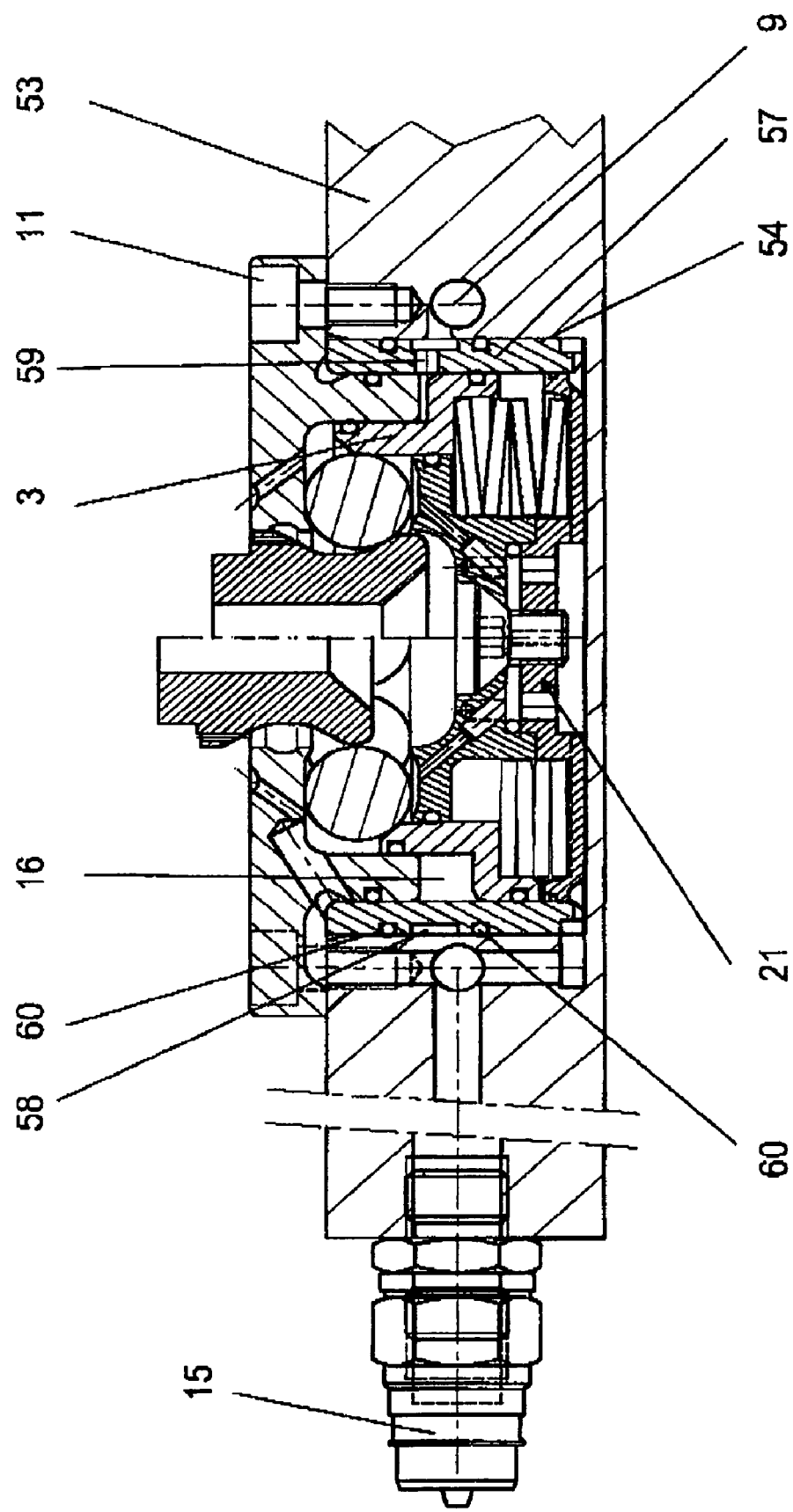
FIG. 14 shows a cross section through an eleventh embodiment of a quick-action clamping cylinder, built into a machine bench.

FIG. 14 shows, as a further embodiment of a quick-action clamping cylinder, a design which is used when the machine bench 53 is not appropriate for oil hydraulics. For example, in the area of the recess 54, Junkers may be present which prevent the piston 3 being sealingly guided with its sealing rings on this surface. For this reason, the invention proposes that a cylinder-shaped tubular housing 57 is first inserted sealingly into the central recess 54, which tubular housing 57 forms the radially outwardly directed sealing and guiding surface for the piston 3.

The tubular housing 57 is provided on its outer circumference with corresponding seals 60 bearing sealingly on the inner wall of the recess 54.

Oil is delivered into the pressure chamber 16 via the oil bore 9, the annular channel 58 and the connection bore 59.

The air can also be delivered in the same way from the other side, the corresponding air-conveying channels in the interior of the quick-action clamping cylinder being supplied via the air inlet 15 and via an upward bore.

Instead of a tubular housing 57, a pot-shaped housing 61 can also be used which in addition to the annular flange according to FIG. 14 is also connected equally integrally to a continuous base 62.

The base 62 at the same time forms the spring support 63 for the spring 8, and it then simply suffices to connect this base 62 to an associated ball support 6 via the previously described screw 7.

Figure 15:
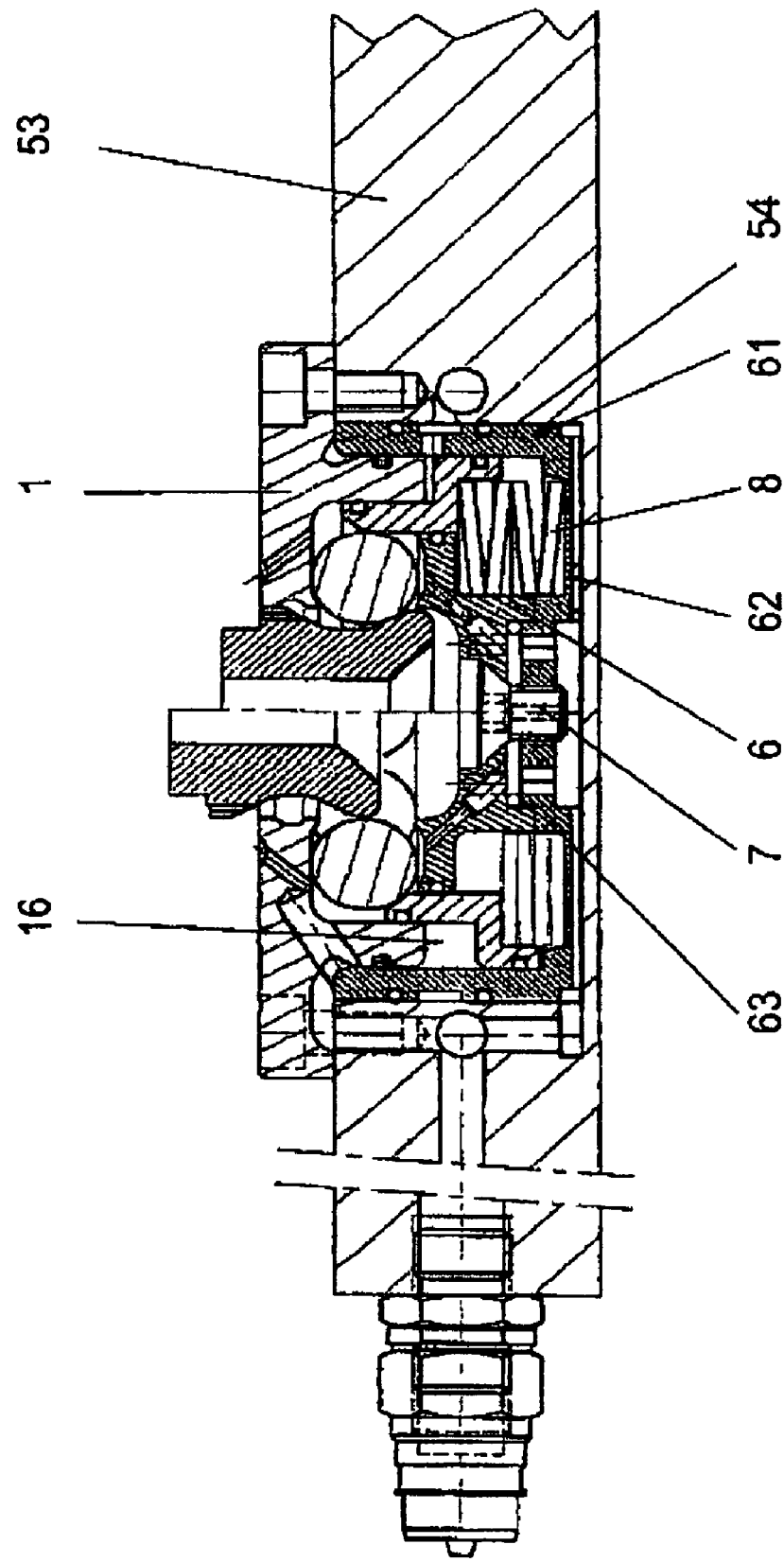
FIG. 15 shows a cross section through a twelfth embodiment of a quick-action clamping cylinder, built into a machine bench.
Figure 16:
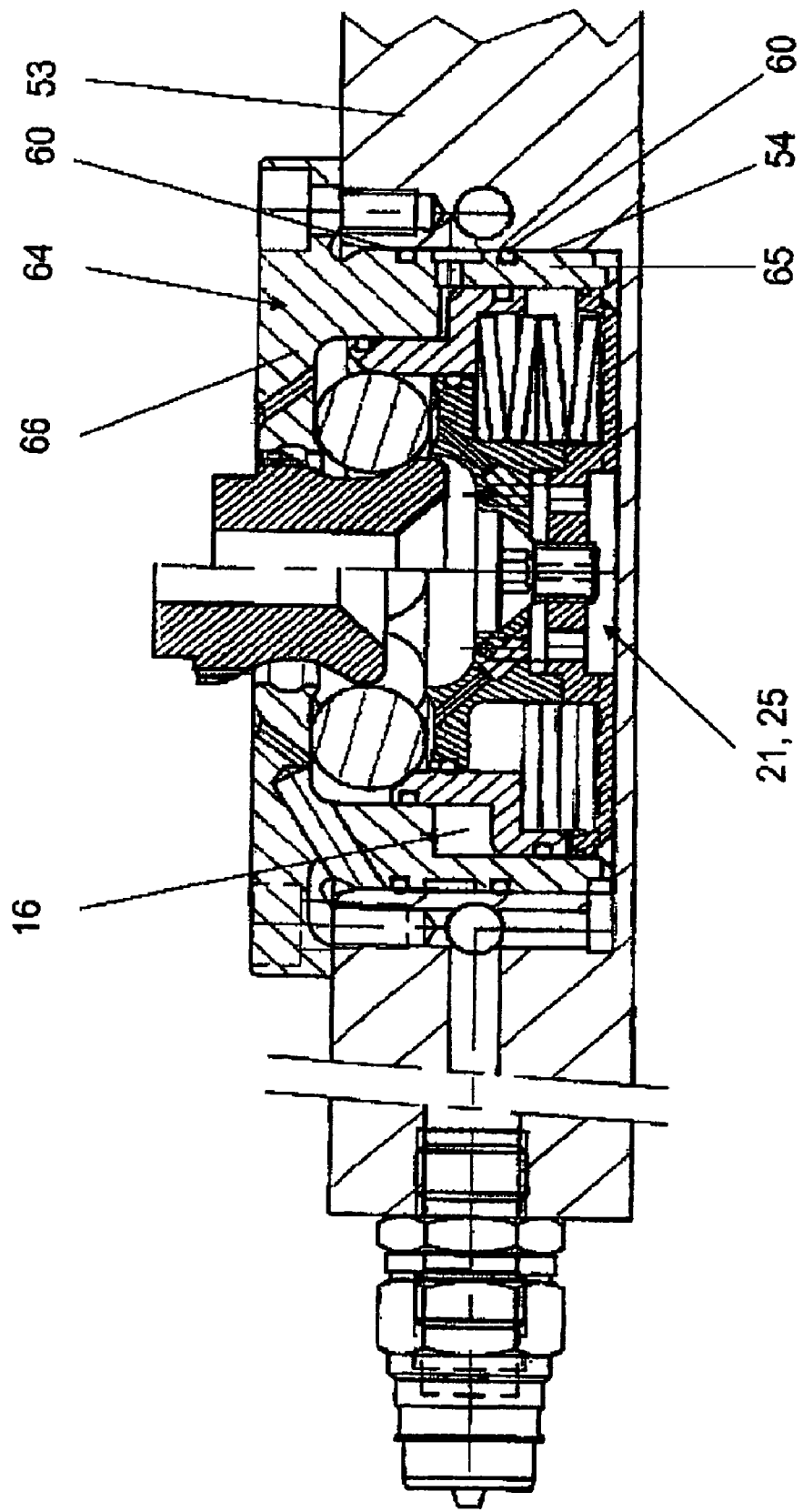
FIG. 16 shows a cross section through a thirteenth embodiment of a quick-action clamping cylinder, built into a machine bench.

FIG. 16 shows, in comparison to FIGS. 14 and 15, that also the analogous reverse can be used, namely that it is not a pot housing 21 that is used, but instead a pot-shaped lid which accordingly forms another pot housing 64. In this case, the lid 66 is integrally connected to an annular flange 65 and thus forms the pot housing 64, which is fitted from above into the central recess 54 and there bears with the seals 60 on the inner wall 54.

The insert module 21 is present as standard and can of course be replaced by the insert module 25.

LIST OF REFERENCE NUMBERS 1 lid
2 feed nipple 2'
3 piston
4 housing
5 ball
6 ball support
7 screw
8 spring
9 oil bore
10 oil inlet
11 screw
12 clamping claw
13 screw
14 securing ring
15 air inlet
16 pressure chamber
17 annular shoulder
18 bevel
19 bevel
20 inclined bore
21 insert module
22 spring-holding plate
23 base
24 air gap
25 insert module
26 spring-holding plate
27 ball support
28 thread
29 seal
30 housing
31 base
32 downward bore
33 passage
34 central recess
35 workpiece pallet
36 threaded pin
37 threaded plug
38 base
39 peg
40 drill bush
41 perforated grid plate
42 catch nipple
43 adapter
44 centering recess
45 centering surface
46 housing
47 cover plate
48 oil passage
49 recess
50 bore
51 arrow direction
52 arrow direction
53 machine bench
54 recess
55 stop ring
56 ball support
57 tubular housing
58 annular channel
59 connection bore
60 seal
61 pot housing
62 base
63 spring support
64 pot housing
65 annular flange
66 lid
67 locking ball
68 sealing ring
69 sealing ring
70 seal
71 seal
72 upward bore
73 inclined bore

The invention claimed is:

1. A quick-action clamping cylinder for anchoring a feed nipple located on any predetermined part, the quick-action clamping cylinder comprising:
 a housing;
 a lid enclosing a space within the housing
 an insert module adapted to fit into the space within the housing, said insert module having a spring assembly, a sealable chamber containing said spring assembly, a spring support base defining an annular seat for one side of the spring assembly, and a ball support member for supporting a plurality of balls movable laterally within the space and adapted releasably to secure the feed nipple in a locked position within the module, an underside of said ball support member and said spring support base being interconnected by a threaded member to compress said spring to a predetermined tensioned position;
 a piston within said housing and biased against each of said balls by said spring assembly to move said balls laterally to engage and lock the feed nipple within the module, said piston being displaceable against the bias of said spring assembly under fluid pressure in said housing to release said balls from the feed nipple;
 a base plate connected to the clamping cylinder and defining a drill bushing; and
 an adapter connected by said threaded member to said insert module, said adapter having a peg-shaped extension engaging said drill bushing.

2. The quick-action clamping cylinder as claimed in claim 1, characterized in that the insert module (21-25) also has an internal seal (71) which prevents air or dirt from entering the spring chamber containing said spring assembly.

3. The quick-action clamping cylinder as claimed in claim 1, in which the adapter (43) is mounted without play in a centering recess (44) on the underside of the insert module (21, 25) in order thereby to ensure centering, likewise without play, of the quick-action clamping cylinder on an associated mounting surface.

4. The quick-action clamping cylinder as claimed in claim 1, comprising a cover plate (47), held by a corresponding securing ring (14).

5. The quick-action clamping cylinder as claimed in claim 1, characterized in that a central recess (34) of the quick-action clamping cylinder is opened toward the bottom to ensure a downward flow of liquid, in arrow direction (51), or also to deliver corresponding air or coolant or comparable media from below, in arrow direction (52).

6. The quick-action clamping cylinder as claimed in claim 1, characterized in that said insert module is embedded in a machine bench having an upwardly central recess 54, an inner circumference of the recess (54) constituting a piston sealing surface and piston running surface for the piston (3).

7. The quick-action clamping cylinder as claimed in claim 6, characterized in that the spring assembly (8) positioned directly under a radial projection on the ball support member (56), and the piston runs sealingly, on the one hand, on an outer face of said radial projection and, on the other hand, on a radial inner face of the central recess (54).

8. The quick-action clamping cylinder as claimed in claim 7, characterized in that a stop ring (55) is fitted in the interior of the recess (54) and serves as a stop surface for the piston (3).

9. The quick-action clamping cylinder as claimed in claim 6, in which pressure oil is introduced into the clamping cylinder radially from the side of the machine bench.

10. The quick-action clamping cylinder as claimed in claim 1, characterized in that the piston (3) has a first radial outer face that runs sealingly on associated O-rings on the inner wall of the lid (1).

11. The quick-action clamping cylinder as claimed in claim 10, characterized in that the piston (3) has a second radial outer face that runs sealingly on the inner circumference of the housing (4).

12. The quick-action clamping cylinder as claimed in claim 11, in which an upper annular surface of said ball support member is grooved to form a raceway supporting the balls when the balls are not engaging the feed nipple.

13. The quick-action clamping cylinder as claimed in claim 12, characterized in that, in the unlocked state of the quick-action clamping cylinder, the balls (5) lie in said raceway supports out of contact with the underside of the lid (1).

14. The quick-action clamping cylinder as claimed in claim 13, in which the underside of the feed nipple defines a radial shoulder to engage a ball when the ball is moved in the locking direction by the piston (3).

15. The quick-action clamping cylinder as claimed in claim 14 in which in the locked position the balls (5) are supported by raised surfaces of the ball support and are clamped against the underside of the lid (1), as a result of which they are no longer movable and reside in an associated annular recess defined by said radial shoulder of the feed nipple (2, 2') so that the latter is absolutely locked and is secured free from play.

16. The quick-action clamping cylinder as claimed in claim 11, in which the piston has an annular radial shoulder, a pressure chamber for oil being defined between the underside of the lid and said annular shoulder.

17. The quick-action clamping cylinder as claimed in claim 16, characterized in that the quick-action clamping cylinder provides a block closure such that the locking of the feed nipple (2, 2') takes place under the force of the spring assembly (8) which moves the piston to press the balls (5) into engagement with the feed nipple (2, 2'), and the unlocking of the quick-action clamping cylinder occurs under the effect of pressure oil on the piston which is introduced into said pressure chamber.

18. The quick-action clamping cylinder as claimed in claim 16, in which said pressure chamber is radially outward and substantially annular and narrow whereby the entire underside of the quick-action clamping cylinder is kept free from pressure oil.

19. The quick-action clamping cylinder as claimed in claim 1, characterized in that the quick-action clamping cylinder holds the feed nipple (2, 2') in the housing (4) with self-locking, so that the balls (5) enter into positive locking engagement with the feed nipple (2, 2').

20. The quick-action clamping cylinder as claimed in claim 1, in which the piston comprises first and second beveled portions, said first beveled portion moving the balls radially inward toward of the feed nipple (2), and, said second beveled portion transmitting the force of the spring assembly to the balls to hold the balls against the feed nipple such that the ratio of the force exerted on the balls by said second beveled portion to the spring force is about 6.5:1, whereby the balls bear with precisely correspondingly great locking force on the feed nipple (2).

21. The quick-action clamping cylinder as claimed in claim 1, comprising bores extending to outlet openings from the interior of the clamping cylinder, to convey drilling water and a medium carrying chips and dirt and the like outwardly and downwardly from the clamping cylinder.

22. The quick-action clamping cylinder as claimed in claim 1 in which a screw-on base (23; 38) defines one or more axially projecting pegs (39) which engage associated drill bushings (40) of a perforated grid plate and thus secure the quick-action clamping cylinder on said perforated grid plate.

* * * * *